United States Patent
Segura Muñoz

(10) Patent No.: US 6,435,136 B1
(45) Date of Patent: Aug. 20, 2002

(54) MACHINE FOR CLEANING, DISINFECTION AND DEPARASITATION OF ANIMALS

(76) Inventor: Angel Maria Segura Muñoz, 43800 Valls, Tarragona (ES)

( * ) Notice: Subject to any disclaimer, the term of this patent is extended or adjusted under 35 U.S.C. 154(b) by 18 days.

(21) Appl. No.: 09/592,511

(22) Filed: Jun. 12, 2000

(51) Int. Cl.[7] .............................................. A01K 29/00
(52) U.S. Cl. ..................... 119/650; 119/665; 119/671
(58) Field of Search .................. 119/665, 669, 119/650, 671, 668, 666, 667, 677, 678, 481; 239/67; 49/475.1, 496.1

(56) References Cited

U.S. PATENT DOCUMENTS

| | | | | |
|---|---|---|---|---|
| 2,499,174 A | * | 2/1950 | Turner | |
| 3,867,906 A | * | 2/1975 | Johnson | 119/158 |
| 3,884,191 A | * | 5/1975 | Stout | 119/158 |
| 4,057,032 A | * | 11/1977 | Dimitriadis | 119/1 |
| 4,382,424 A | * | 5/1983 | Altissimo | 119/158 |
| 4,505,229 A | * | 3/1985 | Altissimo | 119/158 |
| 4,549,502 A | * | 10/1985 | Namdari | 119/158 |
| 4,930,453 A | * | 6/1990 | Laliberte | 119/158 |
| 4,934,559 A | * | 6/1990 | Punam | 220/377 |
| 4,987,860 A | * | 1/1991 | Davis | 119/158 |
| 5,243,931 A | * | 9/1993 | McDonough | 119/158 |
| 5,435,269 A | * | 7/1995 | Chen | 119/158 |
| 5,464,954 A | * | 11/1995 | Kimura et al. | 200/61.62 |
| 5,630,379 A | * | 5/1997 | Gerk | 119/667 |
| 5,724,918 A | * | 3/1998 | Navalon-Chicote | 119/668 |
| 5,769,029 A | * | 6/1998 | Marshall | 119/651 |

FOREIGN PATENT DOCUMENTS

EP 0673599 A1 * 3/1995

* cited by examiner

Primary Examiner—Peter M. Poon
Assistant Examiner—Andrea M. Valenti
(74) Attorney, Agent, or Firm—Robert M. Schwartz

(57) ABSTRACT

An apparatus for cleaning, disinfection and deparasitation of animals, namely domestic pets, comprising a cabin, of a suitable size for the animal, having a means for cleaning, disinfection and deparasitation of the animal, with a programming and control means and including a circuit means for recirculation of the cleaning water and for mixing said water with clean lukewarm water, in addition to a circuit for discharging liquids to drainage, as well as glass panels which allow the animal to see outside the cabin.

8 Claims, 3 Drawing Sheets

MACHINE FOR CLEANING, DISINFECTION AND DEPARASITATION OF ANIMALS

OBJECT OF THE INVENTION

The present invention relates to a machine for cleaning, disinfection and deparasitation of animals, more specifically domestic pets, from among those comprising a cabin of a suitable size for the animal and provided with means for cleaning, disinfection and deparasitation of said animal, attached to a programming and control chamber for these means of the type used in public animal hygiene and cleaning establishments, although at a domestic level.

This invention is mainly characterised by a circuit for recirculation of the cleaning water and for mixing said water with clean lukewarm water, in addition to a circuit for discharging liquids to the drainage, as well as by glass panels which allow the animal to see outside the cabin.

BACKGROUND OF THE INVENTION

Cabins for cleaning, disinfecting and deparasitation of animals are known which are also provided with means for a final drying of said animals, but such cabins present a problem which is mainly centred on two aspects: they create a state of depression for the animal, and they give rise to considerable periods of inactivity which reduce the profitability of said cabin.

The first problem stems from the animals remaining for a long time inside a small, closed and dark cabin, which implies an extremely stressful experience for said animals.

As regards the second aspect, during a full cleaning and drying cycle there is a considerable period of inactivity, corresponding to the drying time, during which the cabin cannot be used for cleaning, which implies that the number of cabins must be increased to obtain a certain productivity, with the resulting increase in cost.

In this sense, Utility Model ES 1027445 can be cited, which incorporates a closet containing the programming and control units for the machine, independent from the cleaning-drying cabin.

DESCRIPTION OF THE INVENTION

The machine for cleaning, disinfecting and deparasitation of animals which is disclosed by the invention, as it comprises an independent unit which is completely separate from the animal drying stage, solves in a fully satisfactory manner the second aspect of the aforementioned disadvantages, as such cleaning machine can start a new cycle immediately after each operational cycle, that is, it can operate continuously as after each cleaning cycle the animal shall exit it to enter a fully independent drying stage, leaving the cleaning machine free to be immediately reused.

A further aspect of the aforementioned disadvantages is solved by the structure of the machine case which comprises the cabin consisting mainly of glass panels, as well as the access door, so that the animal may always see the surroundings of the cabin, and particularly its masters or other people, which naturally reduces the stress of the experience.

Also provided is the possibility of placing inside the cabin movable partitions which create compartments which allow more than one animal to be cleaned simultaneously, depending on their size.

A further characteristic of the invention, the aforementioned recirculation of cleaning water, incorporates, in order to obtain an ideal pressure in the water stream, a vane delivery motor pump with which the water pressure overcomes the animal's fur and manages a deep cleaning.

The water discharge nozzles have been designed to produce a mist which achieves a two-sided effect: on one hand the water will not harm the animal, despite being ejected at a high pressure, and in addition the animal will be thoroughly soaked, reaching its skin, so that all dirt is removed.

The water circuit comprises two inlets, one for hot and one for cold water, which meet at a thermostatic valve which allows regulating the effective temperature at will and which feeds an accumulator reservoir provided with a supporting electrical resistor, in turn aided by an electro valve, which opens as the cycle starts and closes when the accumulator reservoir water is used, either by timing or by a program.

The water contained in the accumulator reservoir is supplied, through at least one more electro valve and by means of the aforementioned motor pump, to the spray nozzles which are conveniently directed towards the area provided for the animal, with a residual water drain provided at the base of the cabin, and with said accumulator reservoir provided with a drainage motor pump, preferably vaned, allowing to selectively eliminate the residual water.

Two filters ensure that both the evacuation water and the recycled water are suitably residue-free.

In addition two diaphragm dosing motor pumps are provided, for dosing of any liquid or gel regardless of its viscosity, which allows the use of a much wider range of products, and particularly does not limit the machine to low viscosity special products. This dosing control can be performed by the motor pump itself or by the machine program.

The door, which as mentioned above is mainly transparent, is provided with a safety switch which shuts down the system in the event of it being opened during the operational cycle of the machine.

The door also incorporates an angular section railing in order to protect the sealing gaskets of the door from the nails of the animal's paws.

The machine incorporates a programmable logic controller aided by the corresponding program for control of each and every element-which takes part in the system, also being provided with a touch-sensitive screen for adjustment or visualization of programs and for programming.

The cabin itself, preferably consisting of stainless steel, in order to permit a virtually indefinite lifetime, allows due to its nature to carry out autoclave operations at a high temperature in order to achieve its full disinfection.

DESCRIPTION OF THE DRAWINGS

Further characteristics and advantages of the present invention will become apparent in view of the accompanying drawings of a preferred embodiment of the same, where for purposes of illustration only and in no way meant as a definition of the limits of the invention, the following is shown.

PREFERRED EMBODIMENT OF THE INVENTION

Figure 1:
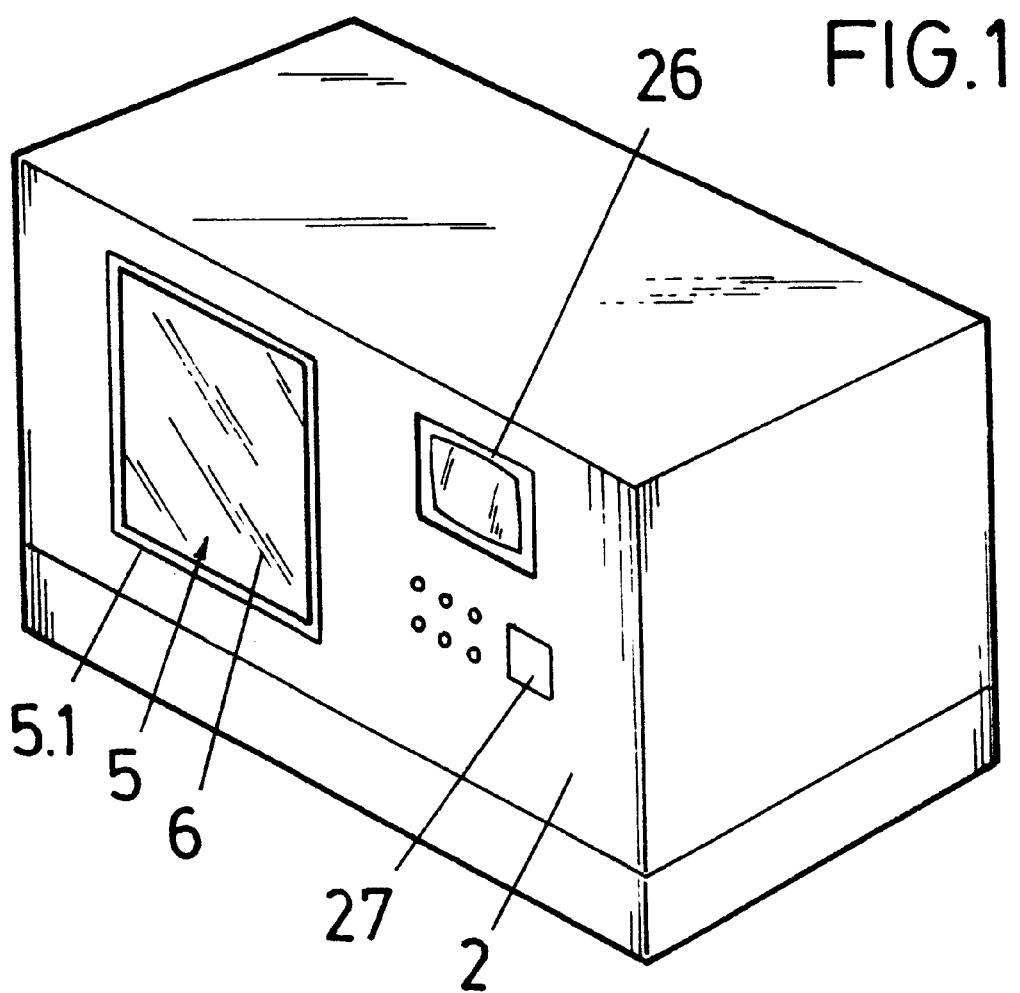
FIG. 1 shows a schematic perspective view of an machine for cleaning, disinfection and deparasitation of animals according to the object of the present invention.
Figure 2:
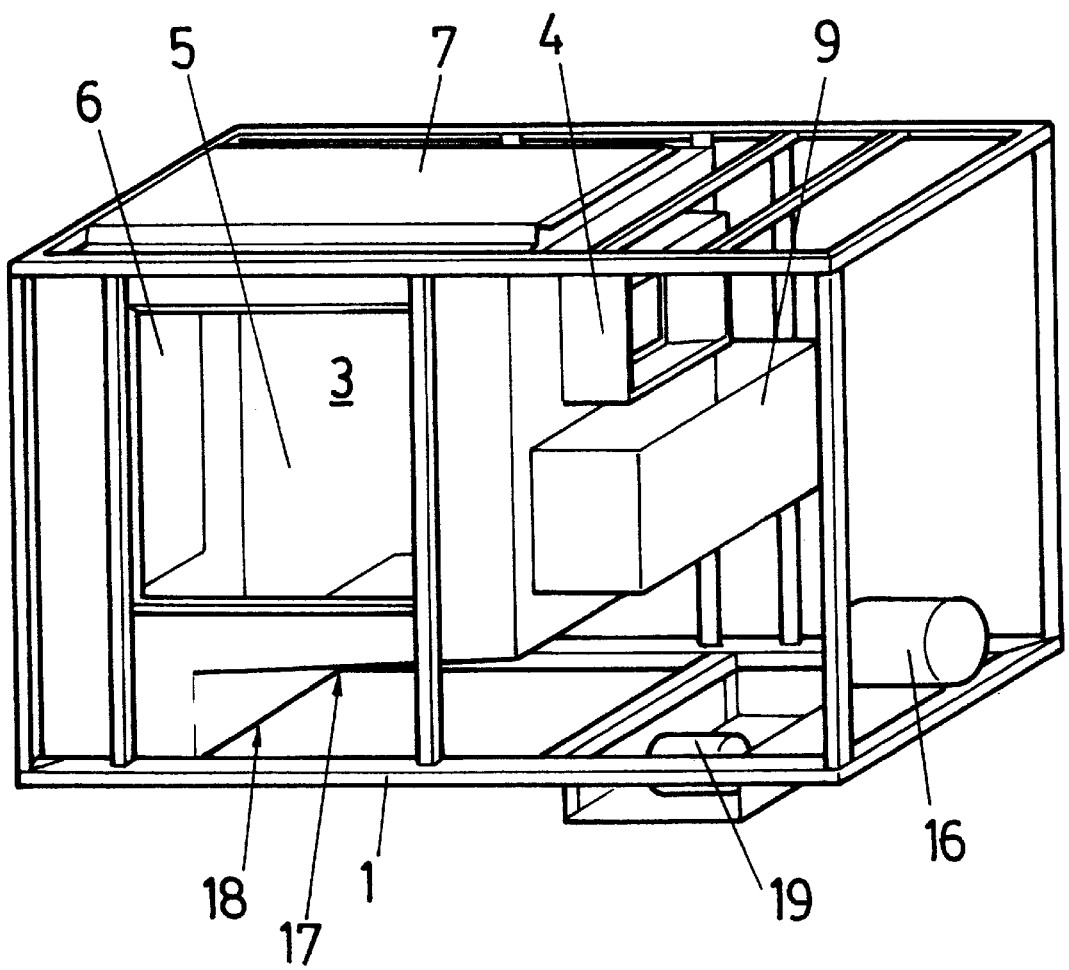
FIG. 2 shows, also in a perspective view, the cabin of the previous figure with its case removed in order to show its inner structure and the location of the main components more clearly.
Figure 3:
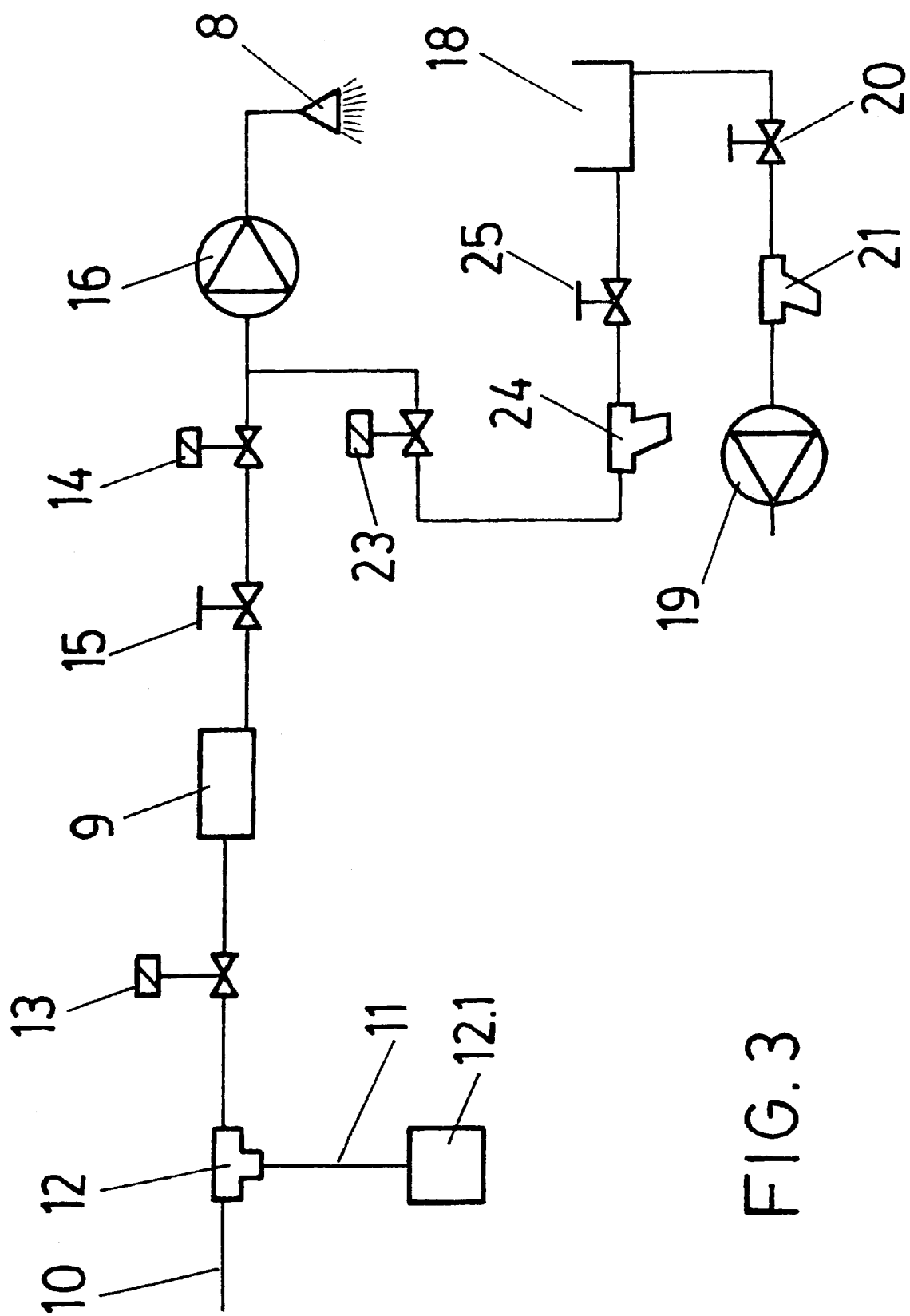
FIG. 3 shows a schematic representation of the hydraulic circuit of the machine of the above figures.

In view of these figures one can appreciate the machine for cleaning, disinfection and deparasitation of animals, of those comprising a cabin provided with the aforementioned means, as well as a chamber for programming and control of these, incorporating a frame (1) of stainless steel bars, which externally receives a case (2) defining a cleaning cabin (3) next to a housing (4) for the various operational elements, with cabin (3) adapted in shape and size to house one or more animals within it, so that if the machine is meant to simultaneously clean several animals, fixed or mobile housing partitions, not shown in the figures, will be provided within it.

The invention is characterised by the front door (5) of cabin (3) having a largely transparent constitution, with side panel (6) of case (2) opposite compartment (4) containing the operational elements of the machine, also mainly transparent, so that the animal or animals housed within the cabin have a direct view of the cabin's surroundings through these transparent walls, thus remaining calmer during the cleaning process and therefore minimising classic stress problems.

Door (5) incorporates a safety switch which shuts down the operational cycle of the machine in the event of it being accidentally opened in mid-process, and additionally incorporates an angular element (5.1) to protect its sealing gaskets against nails of animal paws.

Water spraying or discharge nozzles (8) are provided on top base (7), walls and cabin end wall (3), suitably distributed, and fed from an accumulator reservoir (9) which, prior to each operational cycle of the machine, is filled through a cold water inlet (10) and a hot water inlet (11), the.latter arriving from a water heater (12.1), all meeting at a thermostatic valve (12) which controls the temperature of the mixture and which delivers it, through an electro valve (13), to aforementioned accumulator reservoir (9), which in turn is also provided with an electro valve (14) which is opened at the start of each cycle and remains open until accumulator reservoir (9) is emptied, either by a timer or by programming, with electro valve (14) aided by a manual valve (15) as a safety measure.

Water contained in accumulator reservoir (9) is delivered to spray nozzles (8) aided by a vane delivery motor pump (16) which ensures a high outlet pressure at nozzles (8).

Water discharged through nozzles (8), after spraying and cleaning the animal, falls on bottom (17) of the cabin, which due to a suitable inclination drains to a lower tank or manifold (18) in which an inlet is provided for motor pump (16), aided by a manual valve (25), a filter (24) and electro valves (14) and (23), with. said motor pump (16) also acting as a recirculation pump, which at a given time allows to return the water to the inside of the cabin through the nozzles, after suitable filtering, to complete the cleaning cycle, with the resulting water saving.

The hydraulic system is completed by a drainage system, incorporating a manual valve (20), a filter (21) and a drainage motor pump (19), also vaned.

The elements of the hydraulic circuit described, as well as a small support electrical resistor to maintain the programmed temperature and controls of maximum and minimum water levels provided in the accumulator reservoir (9), are controlled by a PLC assisted by the corresponding program, as well as a touch-sensitive screen (26), suitably placed in the front of case (2), allowing to control or display the programs and to program the machine, with a general switch (27) provided next to the screen (26) with which each operational cycle is started, as well as incorporating an illumination system inside cabin (3), with a lighting timer and button, in order to see the interior during the cleaning process.

What is claimed is:

1. A machine for cleaning, disinfection and deparasitation of animals of the type comprising a cabin which has a large glass window in front door (5), provided with dosing motor pumps, hydraulic conducts, gel and softener deposit, at least one electrical control board, spraying discharge nozzles, nozzles (8), a first reservoir (9) and a lower tank (18), means for realizing any of these, it also incorporates within movable or fixed partitions which define compartments, additionally incorporating a safety switch which stops the operational cycle, as well as an angular section piece (5.1) which protects the sealing gaskets of said door, where the nozzles (8) are fed from the accumulator reservoir (9) provided with a small electrical resistor and an electro valve (14) characterized in that said electro valve (14) opens at the start of each cycle and remains open until reservoir (9) is emptied, by means of either a timer or programming, with electro valve (14) aided by a manual valve (15) as a safety measure, placed before discharge pump (16) to nozzles (8), having another manual valve (25) for recirculation, where the maximum and minimum water levels are controlled by a programmable logic controller and where before each operational cycle of the machine accumulator reservoir (9) is filled through a cold water inlet (10) and a hot water inlet (11) arriving from a water heater (12.1) which meet at a mixing thermostatic valve (12) placed before another electro valve (13).

2. The machine for cleaning, disinfection and deparasitation of animals, as claimed in claim 1, characterized in that after spraying and cleaning the animal, recirculates the liquid arriving from cabin bottom (17) which by means of a suitable inclination drains to a lower tank or manifold (18) which feeds motor pump (16), now for recirculation and aided by a manual valve (25) and a filter (24), so that said electro valve (14) acts parallel to motor pump (16) until the cleaning cycle is completed.

3. The machine for cleaning, disinfection and deparasitation of animals, as claimed in claim 2, characterized in that the maximum and minimum water levels is controlled by a programmable logic controller assisted by a touch-sensitive screen (26).

4. The machine for cleaning, disinfection and deparasitation of animals, as claimed in claim 1, characterized in that it comprises a drain circuit which incorporates a manual valve (20), a filter (21) and a drain motor pump (19), also vaned.

5. The machine for cleaning, disinfection and deparasitation of animals, as claimed in claim 4, characterized in that both the discharge and recirculation motor pump (16) and the drain motor pump (19) are vane discharge pumps.

6. The machine for cleaning, disinfection and deparasitation of animals, as claimed in claim 1, characterized in that it comprises two diaphragm dosing motor pumps in order to dose any liquid or gel, regardless of its viscosity.

7. The machine for cleaning, disinfection and deparasitation of animals, as claimed in claim 1, characterized in that door (5) includes a safety switch which stops the program mid-cycle in the event of the door opening.

8. The machine for cleaning, disinfection and deparasitation of animals, as claimed in claim 1, characterized in that it comprises a lighting system inside cabin (3), with a button and lighting timer in order to see the inside of the cabin during the cleaning process.

* * * * *